(No Model.)   2 Sheets—Sheet 1.

H. A. BARNARD.
Combined Corn Shelier and Cleaner.

No. 240,362.    Patented April 19, 1881.

Witnesses:
H. C. McArthur
John C. Rogers

Inventor:
Heman A. Barnard
per J. H. Alexander
Attorney.

(No Model.) 2 Sheets—Sheet 2.
H. A. BARNARD.
Combined Corn Sheller and Cleaner.
No. 240,362. Patented April 19, 1881.
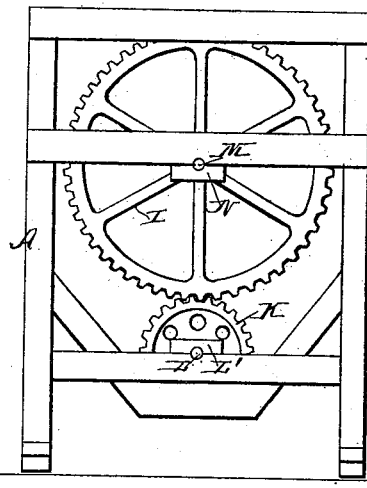
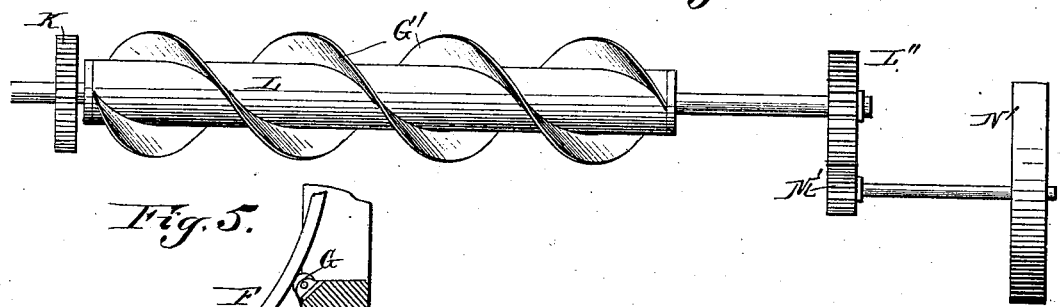
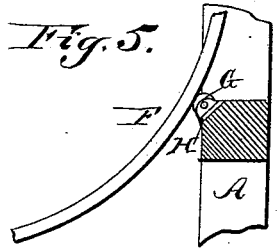
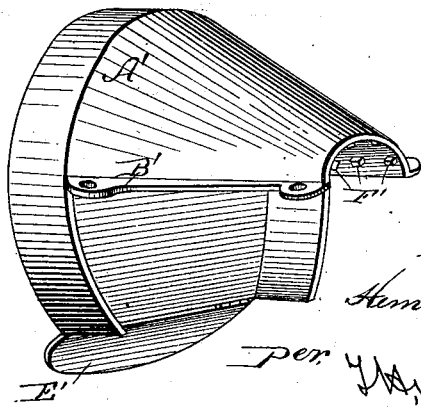
Witnesses:
N. C. McArthur
John C. Rogers
Inventor:
Hiram A. Barnard
per J. H. Alexander
Attorney.

UNITED STATES PATENT OFFICE.

HEMAN A. BARNARD, OF MOLINE, ILLINOIS, ASSIGNOR TO THE BARNARD & LEAS MANUFACTURING COMPANY, OF SAME PLACE.

COMBINED CORN SHELLER AND CLEANER.

SPECIFICATION forming part of Letters Patent No. 240,362, dated April 19, 1881.

Application filed January 14, 1881. (No model.)

*To all whom it may concern:*

Be it known that I, HEMAN A. BARNARD, of Moline, in the county of Rock Island and State of Illinois, have invented certain new and useful Improvements in Combined Corn Shellers and Cleaners; and I do hereby declare that the following is a full, clear, and exact description thereof, reference being had to the accompanying drawings, and to the letters of reference marked thereon, which form part of this specification.

This invention has for its objects to provide a combined corn sheller and cleaner which will be compact, durable, portable, and efficient, and whereby the corn may be removed and separated from the cobs and the lighter impurities—such as cob ends, silk, dust, and chaff—in a most thorough and effective manner, by causing the corn and cobs as they emerge from the sheller to fall onto the screen at its head, whereby they will be compelled to traverse the greater portion of the said screen, and by causing the corn to pass through the meshes of the screen while the cobs pass off at the tail, and conducting the corn and light impurities over a spreader into a separating-trunk, where the light impurities are drawn off by an exhaust-blast. These objects I attain by the apparatus and mechanism illustrated in the accompanying drawings, in which—

Figure 1:
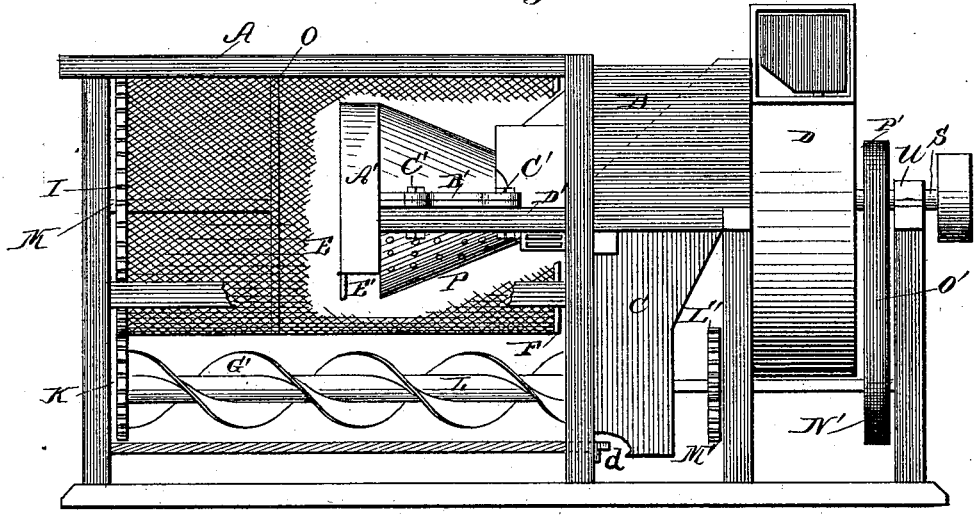
Figure 2:
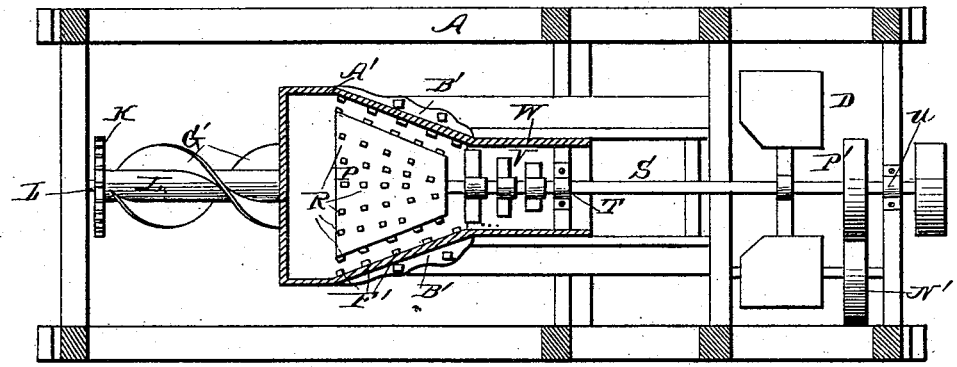

Figure 1 represents a side elevation of my improved apparatus complete, with a portion of the screen broken away, showing the corn-shelling devices. Fig. 2 is a sectional plan view; Fig. 3, an end elevation of the apparatus; Fig. 4, a detached view of a portion of the apparatus, consisting of the conveyer and mechanism for operating the same; Fig. 5, a detached view, showing the method of mounting the inner end of the head of the screen; and Fig. 6, a detached view of the deflector, located over the shelling-iron to direct the grain into the screen and prevent it from being thrown out of the tail thereof and wasted.

The letter A indicates a suitable frame, supporting at the forward end a hopper, B, segmental trunk C, and air-exhaust fan D, as usual in this class of grain-separators.

The letter E indicates a revolving screen, similar in general construction to the revolving screens of the ordinary rotary grain-separators. The said screen, at its forward end or head, is provided with an annulus, F, which sets and is adapted to travel upon friction-rollers G, mounted in suitable bearings, H, secured to the frame A. The rear end of the screen is provided with a spider, I, the periphery of which is provided with a series of cog-teeth, which intermesh with a pinion, K, on the conveyer-shaft L, by means of which rotary motion may be imparted to the screen, as more fully hereinafter specified. The said spider is provided with a shaft, M, one end of which is journaled in a bearing, N, in the frame A, the other end extending into the screen, and being secured to a supporting-spider, O, in said screen.

The letter P indicates the shelling-iron. This consists of a conic frustum, of metal, having a series of strippers or teeth, R, on its periphery and mounted on the main shaft S of the apparatus, which is journaled in bearings T and *u* on the frame. The said shaft is also provided with a series of arms, V, which serve to feed the corn in the ear from the hopper to the shelling-iron.

The letter W indicates a tubular casing, secured to the frame A and extending into the screen at the center of its head. The said casing is made in the form approximating a longitudinal half-section of a conic frustum. This casing is provided with flanges B' at each side, having suitable apertures, by means of which it may be secured, by means of suitable bolts or screws, C', to the beams D', forming part of the frame A, and extending into the forward end of the screen. The said casing is closed at its rear end, and at the lower side of said rear end is provided with a hinged deflector, E', the object of which is to control the delivery of the corn and cobs, as they emerge from the sheller into the screen, in such manner as to deliver such corn and cobs at about a right angle to the axis of the screen, and thus prevent the corn from bounding out at the tail of the screen, the said deflector being adapted to yield to any undue quantity of corn and cobs, and facilitate their escape into the screen and prevent clogging. The inner surface of the casing A' is provided with strippers or teeth F', which act in conjunction with the strippers or teeth on the shelling-iron, to remove the corn from the cob.

Below the screen is located a screw-conveyer, G', which is mounted on a shaft, L, journaled in bearings in the frame A. The said shaft, at one end, is provided with a gear-wheel, I'', intermeshing with a gear-wheel, M', which is journaled in suitable bearings in the frame A, and provided with a pulley, N', receiving motion, by means of the belt O', from a pulley, P', on the main shaft of the apparatus. The rear end of the screw-shaft is provided with a gear-wheel, K, which gives motion to the toothed spider I at the rear end of the separating-screen. The lower end of the separating-trunk C is provided with a spreader, d, which is to spread the corn from the conveyer, so that the air ascending the trunk can act on it effectively. This spreader consists of an angular plate, located in the lower end of the separating-trunk, so that as the corn is passed out of the conductor it is spread over the spreader in a thin sheet, and the air can pass through it easily.

The operation of my invention will be readily understood in connection with the above description, and is as follows: The ears of corn are fed into the hopper and pass to the sheller located in the screen. Here the grain is stripped or shelled from the cobs, after which the corn and cobs pass onto the rotary screen, near its head, and the grain is separated from the cobs in the usual manner, the cobs passing out at the tail of the machine and the grain through the perforations in the screen into the conveyer-chamber, from which it is carried to the separating-trunk by the conveyer, the dust, silk, chaff, cob ends, and other light impurities being drawn off by the fan.

Having thus fully described my invention, what I claim, and desire to secure by Letters Patent, is—

1. The combination, with the rotary screen E, supported from the outside at its front end, of the sheller-iron P and casing A', arranged to project within said screen, the casing being secured in place by connections which hold it to the beam D', substantially as specified.

2. In combination with the rotary screen, the shelling-iron and its casing projecting therein, the said casing being provided with a hinged deflector, substantially as and for the purposes specified.

In testimony that I claim the foregoing as my own I affix my signature in presence of two witnesses.

HEMAN A. BARNARD.

Witnesses:
J. SILAS LEAS,
J. S. GILLMORE.